US009507749B2

(12) United States Patent
Lee

(10) Patent No.: US 9,507,749 B2
(45) Date of Patent: Nov. 29, 2016

(54) COMMUNICATION SYSTEM AND METHOD OF GENERATING GEOGRAPHIC SOCIAL NETWORKS IN VIRTUAL SPACE

(71) Applicant: Jong W. Lee, Cliffside Park, NJ (US)

(72) Inventor: Jong W. Lee, Cliffside Park, NJ (US)

(*) Notice: Subject to any disclaimer, the term of this patent is extended or adjusted under 35 U.S.C. 154(b) by 732 days.

(21) Appl. No.: 13/896,533

(22) Filed: May 17, 2013

(65) Prior Publication Data

US 2013/0311567 A1    Nov. 21, 2013

Related U.S. Application Data

(60) Provisional application No. 61/648,338, filed on May 17, 2012.

(51) Int. Cl.
| G06F 15/16 | (2006.01) |
| G06F 15/163 | (2006.01) |
| H04L 29/08 | (2006.01) |
| G06Q 50/00 | (2012.01) |
| H04L 12/58 | (2006.01) |
| H04W 4/02 | (2009.01) |

(52) U.S. Cl.
CPC ............ *G06F 15/163* (2013.01); *G06Q 50/01* (2013.01); *H04L 29/08072* (2013.01); *H04L 51/20* (2013.01); *H04L 51/32* (2013.01); *H04L 67/26* (2013.01); *H04W 4/021* (2013.01)

(58) Field of Classification Search
CPC .............................. G06F 17/30; G06Q 10/10
USPC ................. 709/217, 218, 219, 228; 707/784
See application file for complete search history.

(56) References Cited

U.S. PATENT DOCUMENTS

| 8,024,317 | B2* | 9/2011 | Nair ...................... G06Q 30/02 |
| | | | 705/14.66 |
| 8,032,508 | B2* | 10/2011 | Martinez ........... G06F 17/30867 |
| | | | 707/602 |
| 8,473,517 | B2* | 6/2013 | Sly .......................... G01C 21/32 |
| | | | 707/784 |
| 8,539,359 | B2* | 9/2013 | Rapaport ............... G06Q 10/10 |
| | | | 709/217 |
| 8,850,535 | B2* | 9/2014 | Liberman ............. H04L 9/3231 |
| | | | 713/186 |
| 2007/0037574 | A1 | 2/2007 | Libov et al. |
| 2008/0045236 | A1 | 2/2008 | Nahon et al. |
| 2008/0132243 | A1 | 6/2008 | Spalink et al. |
| 2010/0125604 | A1* | 5/2010 | Martinez ........... G06F 17/30867 |
| | | | 707/784 |
| 2010/0280904 | A1 | 11/2010 | Ahuja |
| 2010/0332326 | A1 | 12/2010 | Ishai |
| 2011/0126132 | A1 | 5/2011 | Anderson et al. |
| 2011/0137997 | A1 | 6/2011 | Stewart |
| 2011/0145355 | A1 | 6/2011 | Mattern |
| 2011/0238755 | A1 | 9/2011 | Khan et al. |
| 2011/0258049 | A1* | 10/2011 | Ramer ............. G06F 17/30867 |
| | | | 705/14.66 |
| 2012/0016794 | A1 | 1/2012 | Orr et al. |
| 2012/0209708 | A1* | 8/2012 | Ramer ............. G06F 17/30867 |
| | | | 705/14.51 |
| 2012/0209709 | A1* | 8/2012 | Ramer ............. G06F 17/30867 |
| | | | 705/14.51 |

* cited by examiner

*Primary Examiner* — Khanh Dinh
(74) *Attorney, Agent, or Firm* — Law Office of Ilya Libenzon

(57) ABSTRACT

A system and related method are disclosed for location-sensitive social networking. A server has access to a map and a list of points of interest with location data by which they may be located on the map. The server establishes a virtual area around a point of interest based on a certain distance or time from the point of interest, a physical or legal parameter, or some combination of those techniques. Users whose devices are located within the virtual area are published to users of the system, and identified distinctly for social networking and communication. Users may also form groups.

18 Claims, 10 Drawing Sheets

COMMUNICATION SYSTEM AND METHOD OF GENERATING GEOGRAPHIC SOCIAL NETWORKS IN VIRTUAL SPACE

RELATED APPLICATION DATA

This application claims the priority of prior U.S. provisional application Ser. No. 61/648,338 filed on May 17, 2012, which is hereby incorporated by reference herein in its entirety.

TECHNICAL FIELD

Embodiments disclosed herein relate generally to electronic social networking systems, and particularly to the use of such systems in conjunction with mapping and navigation systems.

BACKGROUND ART

Electronic social networking is an increasingly ubiquitous way to socialize and connect. People use some networks to keep track of old friends, others to maintain professional contacts, and others still to connect to people with similar interests and hobbies. A particularly popular and long-running use of social networks is to plan social and professional events. However, the social network facilities that currently exist have serious shortcomings with regard to event planning. In particular, it is a perennial challenge to find the most convenient places and times for a gathering; this part of planning generally requires communication with large numbers of potential attendees, often with unreliable results. It is especially challenging for groups of people, as opposed to a single organizer, to plan events using social networking, because of the increased volume of communication necessary to do so. Finally, it remains difficult to keep track of people who are just arriving or may be lost, requiring a great deal of further communication to help stragglers figure out where their party is.

Thus, there remains a need for a social networking application that allows users to make well-informed logistical choices while planning group activities.

SUMMARY OF THE EMBODIMENTS

One embodiment of the disclosed method for location-sensitive social networking comprises selecting, by the server, at least one point of interest maintained in memory accessible to the server, determining, by the server, at least one virtual area around the at least one point of interest, detecting, by the server, devices in use within the virtual area, and publishing, by the server, the results of that detection to at least one client device.

In a related set of embodiments, selecting the at least one point of interest comprises transmitting, by the server, a set of all points of interest belonging to a particular geographical area to a client device operated by a user and receiving, by the server and from the client device, user inputs selecting at least one point of interest from the set. In another embodiment, selecting the at least one point of interest involves transmitting, by the server, a set of all points of interest belonging to a particular category to a client device operated by a user and receiving, by the server and from the client device, user inputs selecting at least one point of interest from the set. According to an additional embodiment, selecting the at least one point of interest comprises receiving, by the server, a user-input query and finding, by the server, at least one point of interest matching the query.

In another related embodiment, determining the at least one virtual area comprises establishing a maximum distance from one point of interest such that all points closer to the point of interest than the maximum distance are in the virtual area. According to another embodiment, determining the at least one virtual area involves establishing a maximum time such that all persons capable of arriving at one point of interest within the maximum time are in the virtual area. Another embodiment involves determining the at least one virtual area by determining the physical boundaries of a property containing one point of interest. Under another embodiment, determining the at least one virtual area comprises determining the legal boundaries of a property containing one point of interest. According to yet another embodiment, determining the at least one virtual area involves combining at least two virtual areas into a new virtual area containing their union. In another embodiment still, determining the at least one virtual area comprises combining at least two virtual areas into a new virtual area containing their intersection. An additional embodiment involves determining the at least one virtual area by determining, by the server, a category to which one point of interest belongs and determining, by the server, the size of the virtual area based on the category. According to another embodiment still, determining the at least one virtual area further comprises maintaining, by the server, customer ratings of one point of interest in memory accessible to the server and determining, by the server, the size of the virtual area based on the customer ratings.

In another related embodiment, detecting devices in use within the at least one virtual area comprises identifying a device having a fixed location known to be in the at least one virtual area. Another embodiment involves detecting devices in use within the at least one virtual area by receiving, from a device, location data, determining that the location data falls within the at least one virtual area, and identifying the device as located within the at least one virtual area. Another embodiment involves detecting at least one local wireless transmitter, measuring the strength of signal of the at least one transmitter to calculate an approximate distance from the transmitter, and using the approximate distance and the location data to determine the vertical location of the device.

A related embodiment involves determining that the location data falls within the at least one virtual area by computing the distance from the location data to the point of interest, and determining that a point within the computed distance of the point of interest is in the virtual area. According to another embodiment, determining that the location data falls within the at least one virtual area comprises deriving a collection of coordinates that fall on the boundaries of the virtual area, and comparing the location data to the coordinates in the collection. According to a related embodiment, determining that the location data falls within the at least one virtual area comprises determining a display resolution, mapping the coordinates corresponding to each pixel within the virtual area at the determined resolution, and matching the location data to the coordinates corresponding to a pixel in the virtual area at the determined resolution.

In an additional embodiment, the step of publishing comprises determining, by the server, the user of a device in the at least one virtual area, determining, by the server, a user group in which the user is a member, determining the members of the user group, and publishing the location of the device only to members of the user group. Another embodiment involves providing, by the server, communication services between users. Another embodiment involves restricting at least one of the communication services to members of a user group. Another embodiment comprises restricting at least one of the communication services to devices located in the at least one virtual area.

Also disclosed is a system for location-sensitive social networking, comprising at least one server having a processor and a memory, a map component, executing on the server, selecting, by the server, at least one point of interest maintained in memory accessible to the server, and determining at least one virtual area around the at least one point of interest, a device location component, executing on the server and detecting devices in use within the at least one virtual area, and a social network component, executing on the server and publishing the results of that detection to at least one client device.

Other aspects, embodiments and features of the system and method will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the system and method shown where illustration is not necessary to allow those of ordinary skill in the art to understand the system and method.

BRIEF DESCRIPTION OF THE DRAWINGS

The preceding summary, as well as the following detailed description of the disclosed system and method, will be better understood when read in conjunction with the attached drawings. For the purpose of illustrating the system and method, presently preferred embodiments are shown in the drawings. It should be understood, however, that neither the system nor the method is limited to the precise arrangements and instrumentalities shown.

DETAILED DESCRIPTION OF SPECIFIC EMBODIMENTS

Figure 1:
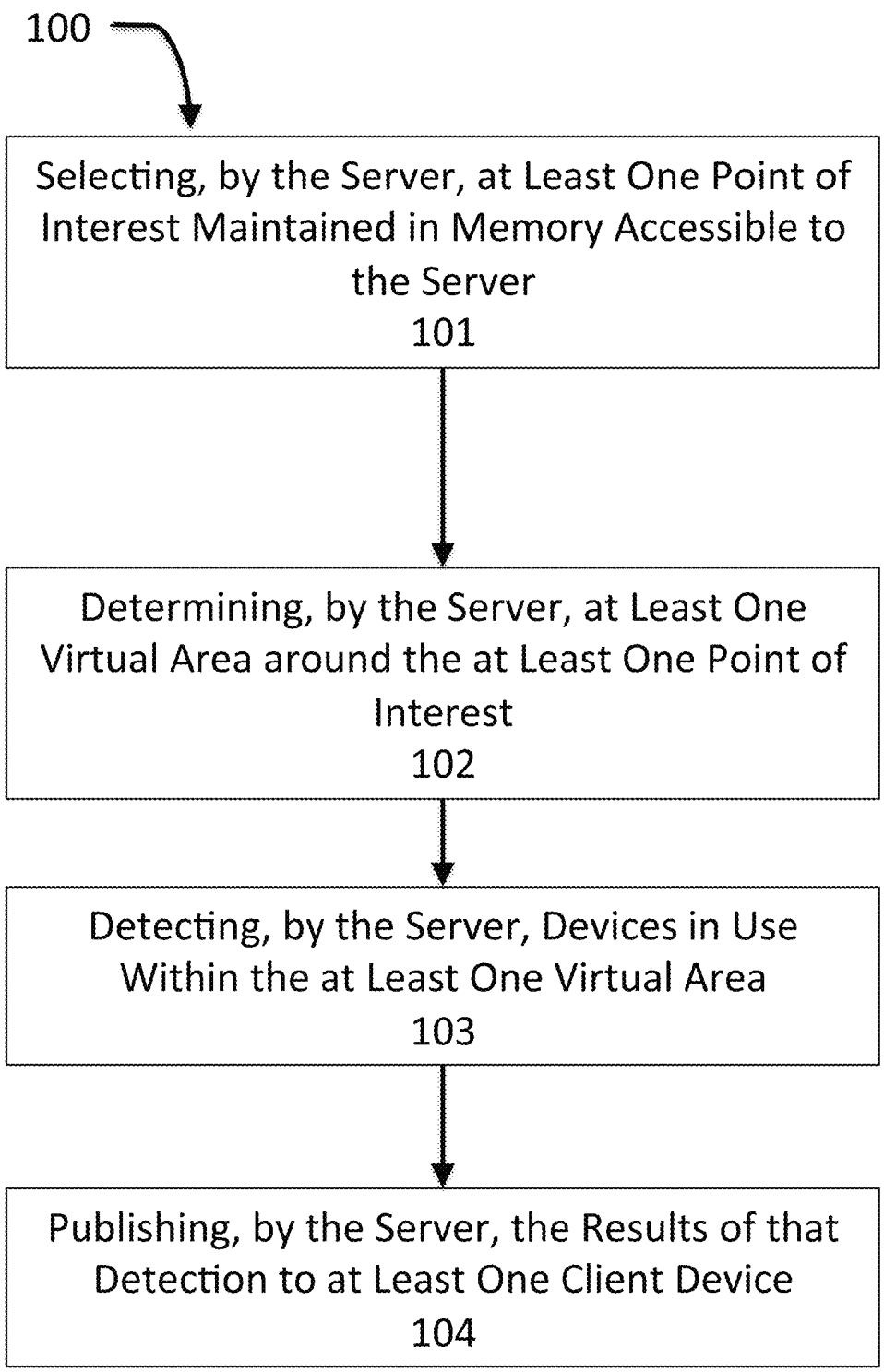
FIG. 1 is a flow chart illustrating one embodiment of the disclosed method.

Definitions. As used in this description and the accompanying claims, the following terms shall have the meanings indicated, unless the context otherwise requires.

An "electronic device" is defined as including personal computers, laptops, tablets, smart phones, and any other electronic device capable of supporting an application as set forth in more detail below.

A device or component is "coupled" to an electronic device if it is so related to that electronic device that the device or component and the electronic device may be operated together as one machine. In particular, a piece of electronic equipment is coupled to an electronic device if it is incorporated in the electronic device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the electronic device by shared membership in some network consisting of wireless and wired connections between multiple machines (e.g. a printer in an office that prints documents to computers belonging to that office, no matter where they are, so long as they and the printer can connect to the internet).

"Data entry devices" is a general term for all equipment coupled to an electronic device that may be used to enter data into that device. This definition includes, without limitation, keyboards, computer mouses, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure.

An electronic device's "display" is a device coupled to the electronic device, by means of which the electronic device can display images. Display includes without limitation monitors, screens, television devices, and projectors.

An electronic device's "navigation facility" is any facility coupled to the electronic device that enables the device accurately to calculate the device's location on the surface of the Earth. Navigation facilities can include a receiver configured to communicate with the Global Positioning System or with similar satellite networks, as well as any other system that mobile phones or other devices use to ascertain their location, for example by communicating with cell towers.

To "maintain" data in the memory of an electronic device means to store that data in that memory in a form convenient for retrieval as required by the algorithm at issue, and to retrieve, update, or delete the data as needed.

Figure 2:
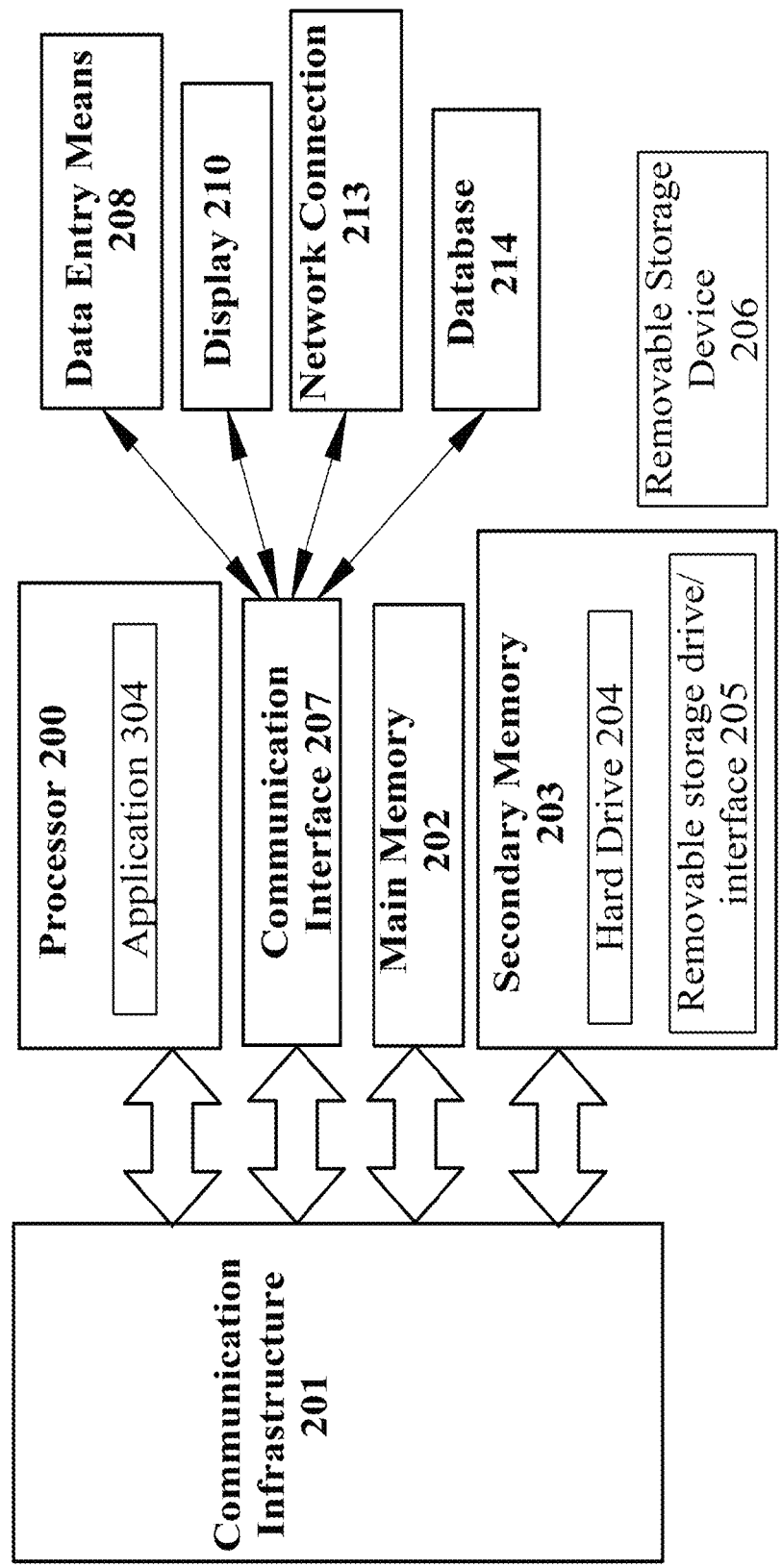
FIG. 2 is a schematic diagram depicting an example of an electronic device as described herein.

The system and method disclosed herein will be better understood in light of the following observations concerning the electronic devices that support the disclosed application, and concerning the nature of web applications in general. An exemplary electronic device is illustrated by FIG. 2. The processor 200 may be a special purpose or a general-purpose processor device. As will be appreciated by persons skilled in the relevant art, the processor device 200 may also be a single processor in a multi-core/multiprocessor system, such system operating alone, or in a cluster of computing devices operating in a cluster or server farm. The processor 200 is connected to a communication infrastructure 201, for example, a bus, message queue, network, or multi-core message-passing scheme.

The electronic device also includes a main memory 202, such as random access memory (RAM), and may also include a secondary memory 203. Secondary memory 203 may include, for example, a hard disk drive 204, a removable storage drive or interface 205, connected to a removable storage unit 206, or other similar devices. As will be appreciated by persons skilled in the relevant art, a removable storage unit 206 includes a computer usable storage medium having stored therein computer software and/or data. Examples of additional facilities creating secondary memory 203 may include a program cartridge and cartridge interface (such as that found in video game devices), a removable memory chip (such as an EPROM, or PROM) and associated socket, and other removable storage units 206 and interfaces 205 which allow software and data to be transferred from the removable storage unit 206 to the computer system.

The electronic device may also include a communications interface 207. The communications interface 207 allows software and data to be transferred between the electronic device and external devices. The communications interface 207 may include a modem, a network interface (such as an Ethernet card), a communications port, a PCMCIA slot and card, or other devices or components to couple the electronic device to external devices. Software and data transferred via the communications interface 207 may be in the form of signals, which may be electronic, electromagnetic, optical, or other signals capable of being received by the communications interface 207. These signals may be provided to the communications interface 207 via wire or cable, fiber optics, a phone line, a cellular phone link, and radio frequency link or other communications channels. The communications interface in the system embodiments discussed herein facilitates the coupling of the electronic device with data entry devices 208, the device's display 210, and network connections, whether wired or wireless 213. It should be noted that each of these devices may be embedded in the device itself, attached via a port, or tethered using a wireless technology such as BLUETOOTH®.

Computer programs (also called computer control logic) are stored in main memory 202 and/or secondary memory 203. Computer programs may also be received via the communications interface 207. Such computer programs, when executed, enable the processor device 200 to implement the system embodiments discussed below. Accordingly, such computer programs represent controllers of the system. Where embodiments are implemented using software, the software may be stored in a computer program product and loaded into the electronic device using a removable storage drive or interface 205, a hard disk drive 204, or a communications interface 207.

The electronic device may also store data in database 212 accessible to the device. A database 212 is any structured collection of data. As used herein, databases can include "NoSQL" data stores, which store data in a few key-value structures such as arrays for rapid retrieval using a known set of keys (e.g. array indices). Another possibility is a relational database, which can divide the data stored into fields representing useful categories of data. As a result, a stored data record can be quickly retrieved using any known portion of the data that has been stored in that record by searching within that known datum's category within the database 212, and can be accessed by more complex queries, using languages such as Structured Query Language, which retrieve data based on limiting values passed as parameters and relationships between the data being retrieved. A database can be created in any digital memory.

Persons skilled in the relevant art will also be aware that while any device must necessarily comprise facilities to perform the functions of a processor 200, a communication infrastructure 201, at least a main memory 202, and usually a communications interface 207, not all devices will necessarily house these facilities separately. For instance, in some forms of electronic devices as defined above, processing 200 and memory 202 could be distributed through the same hardware device, as in a neural net, and thus the communications infrastructure 201 could be a property of the configuration of that particular hardware device. Many devices do practice a physical division of tasks as set forth above, however, and practitioners skilled in the art will understand the conceptual separation of tasks as applicable even where physical components are merged.

The systems may be deployed in a number of ways, including on a stand-alone electronic device, a set of electronic devices working together in a network, or a web application. Persons of ordinary skill in the art will recognize a web application as a particular kind of computer program system designed to function across a network, such as the Internet. A schematic illustration of a web application platform is provided in FIG. 3. Web application platforms typically include at least one client device 300, which is an electronic device as described above. The client device 300 connects via some form of network connection to a network 301, such as the Internet. The network 301 may be any arrangement that links together electronic devices 300, 302, and includes without limitation local and international wired networks including telephone, cable, and fiber-optic networks, wireless networks that exchange information using signals of electromagnetic radiation, including cellular communication and data networks, and any combination of those wired and wireless networks. Also connected to the network 301 is at least one server device 302, which is also an electronic device as described above. Of course, practitioners of ordinary skill in the relevant art will recognize that a web application can, and typically does, run on several server devices 302 and a vast and continuously changing population of client devices 300. Computer programs on both the client device 300 and the server device 302 configure both devices to perform the functions required of the web application 304. Web applications 304 can be designed so that the bulk of their processing tasks are accomplished by the server device 302, as configured to perform those tasks by its web application program, or alternatively by the client device 300. However, the web application must inherently involve some programming on each device.

Many electronic devices, as defined herein, come equipped with a specialized program, known as a web browser, which enables them to act as a client device 300 at least for the purposes of receiving and displaying data output by the server device 302 without any additional programming. Web browsers can also act as a platform to run so much of a web application as is being performed by the client device 300, and it is a common practice to write the portion of a web application calculated to run on the client device 300 to be operated entirely by a web browser. Such browser-executed programs are referred to herein as "client-side programs," and frequently are loaded onto the browser from the server 302 at the same time as the other content the server 302 sends to the browser. However, it is also possible to write programs that do not run on web browsers but still cause an electronic device to operate as a web application client 300. Thus, as a general matter, web applications 304 require some computer program configuration of both the client device (or devices) 300 and the server device 302 (or devices). The computer program that comprises the web application component on either electronic device's system FIG. 2 configures that device's processor 200 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Finally, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

Embodiments of the disclosed method and system enable people to plan events and to congregate conveniently by combining the power of social networking with the ability of electronic devices to determine their location, and thus the location of persons using the devices. The embodiments set forth below permit a user to see if anybody he or she knows is located in a place the user is considering visiting. A group of users can determine which prospective meeting place is most quickly accessible to the majority of the group. People who are in or near a place can communicate about it among themselves or invite their friends from elsewhere to join them.

Figure 4:
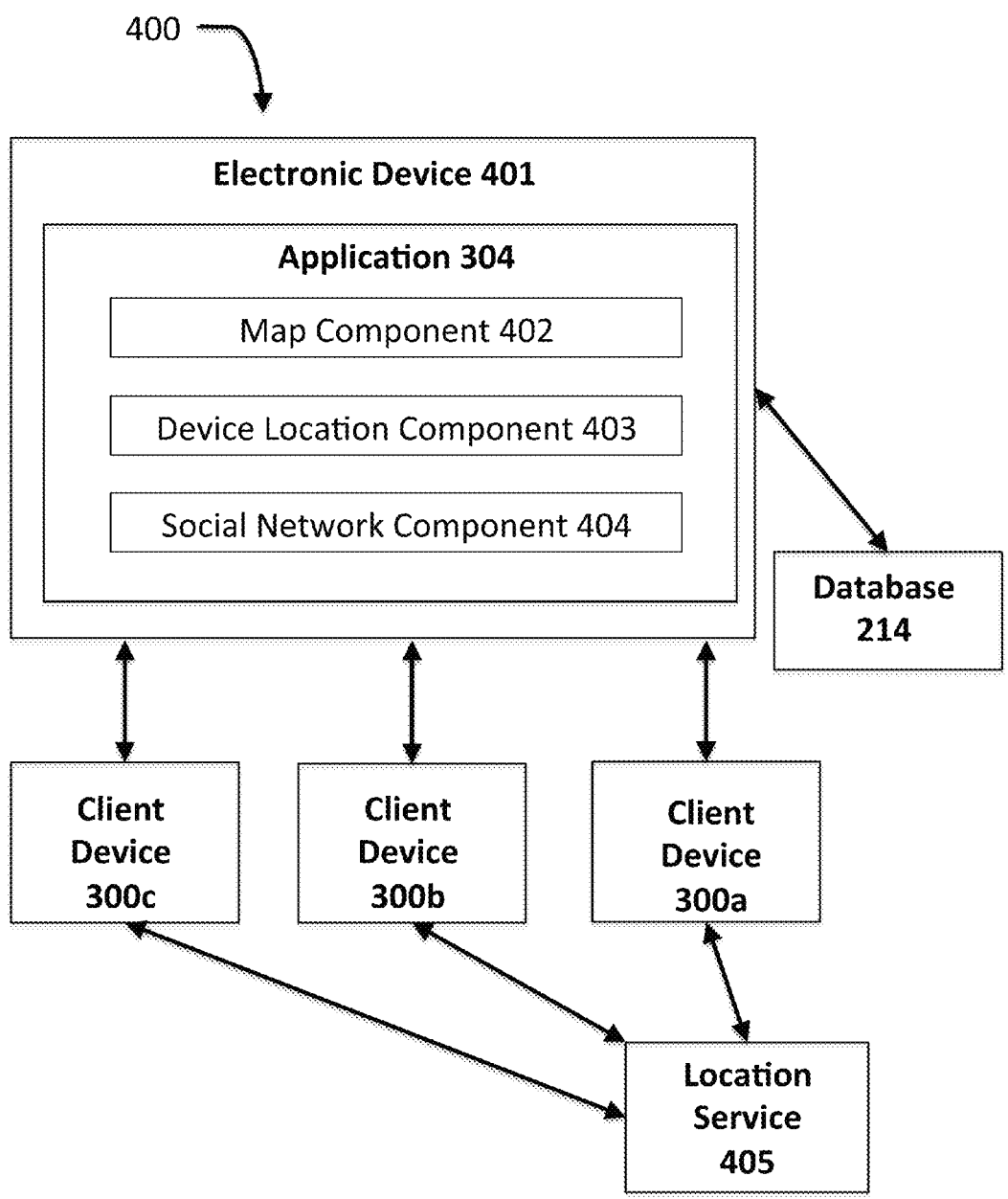
FIG. 4 is a block diagram depicting one embodiment of the disclosed system.

FIG. 4 illustrates some embodiments of the disclosed system 400. The first element is at least one server 302. The server 302 is connected to one or more client devices 300a-c via a network 301, such as the Internet. The server 302 is programmed or configured to perform the tasks of an application 304. The tasks the application 304 performs may be conceptually divided into a map component 402, a device location component 403, and a social network component 404. The organization of tasks into those three components solely reflects a categorization of the tasks to be performed, and does not dictate the architecture of particular implementations of the system 400.

Figure 3:
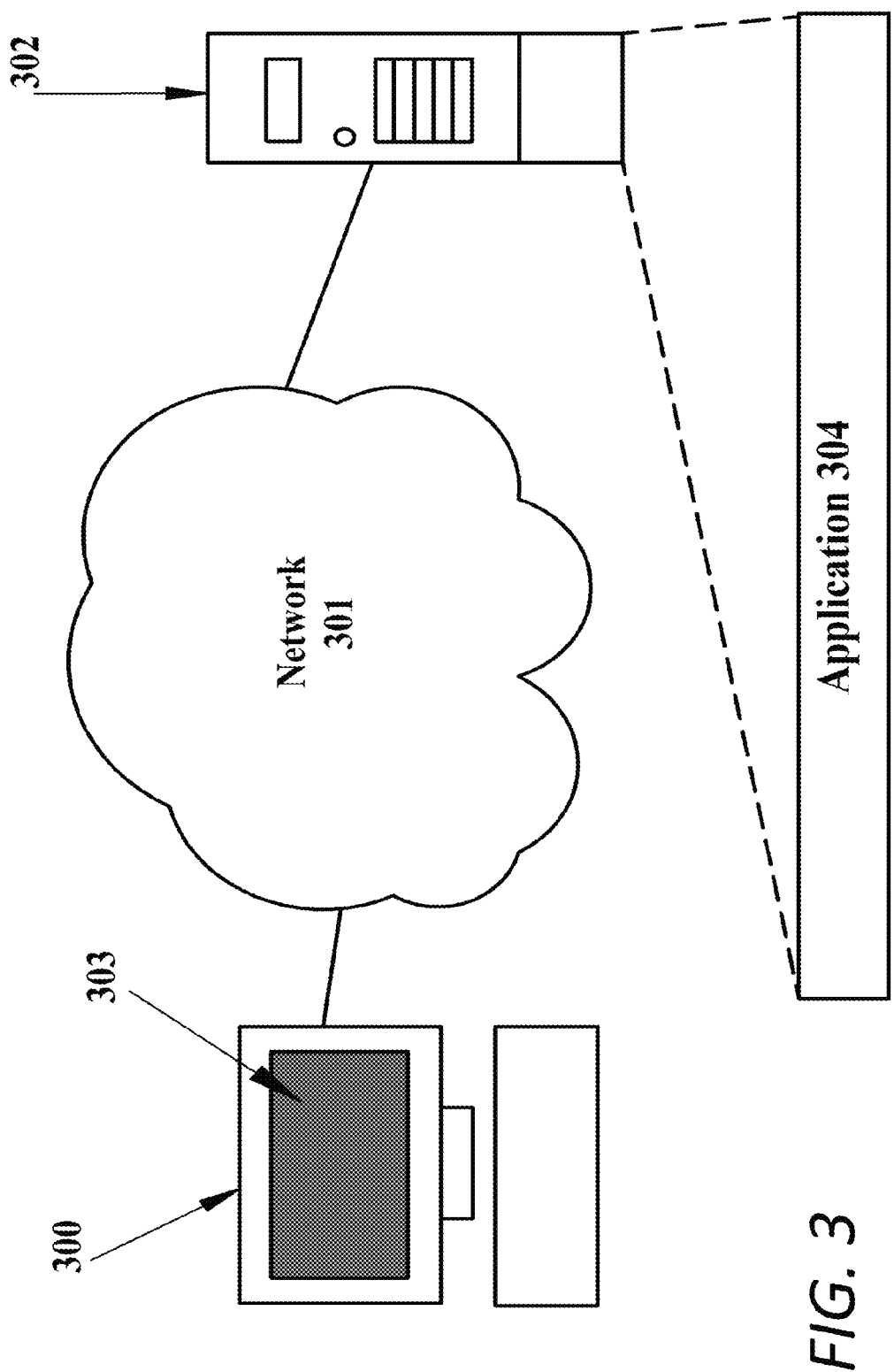
FIG. 3 is a schematic diagram of a web application platform, as disclosed herein.

In some embodiments, the server is an electronic device as disclosed above in reference to FIGS. 2 and 3. In other embodiments, the server 302 may be a set of several such devices (not shown) coordinated to work together as a unit. In some embodiments, one of the server 302 devices is or contains a database 214 as described above in reference to FIGS. 2-3. In some embodiments, the set of devices comprising the server 302 includes a specialized computer for coordinating map details.

The client devices 300a-b that connect to the server may be client devices 300 as set forth above in reference to FIGS. 2 and 3. In some embodiments, the client devices 300a-b may be mobile devices such as a mobile telephone or a smartphone. In other embodiments, the client devices 300a-b may be laptops, netbooks, or desktop computers. Some client devices 300a-b may possess navigation facilities. In particular, some client devices 300a-b may be enabled to contact location services 405. Location services 405 are services that feed location and navigation data to the navigation facilities of client devices 300a-c. Location services may include the Global Positioning System (GPS) and similar satellite-based services that permit a client device 300a-b to determine its location on the surface of the Earth using a system of coordinates, such as latitude and longitude or polar coordinates. Location services may also include a cellular network comprised of a set of transmitters and the electromagnetic signals they emit, such that a client device 300a-b can locate itself in relative terms by cell-tower triangulation 300a-b. In some embodiments, a client device may use the relative location data it acquires through cell-tower triangulation to determine its location in terms of a coordinate system such as latitude and longitude or polar coordinates. In some embodiments, the client devices 300a-b transmit the location data captured from location services 405 by the navigation facilities of client devices 300a-b to the device location component 403 executing on the server.

The application 304 may be composed of one or more a computer programs as described above in reference to FIGS. 2 and 3. The application 304 may also include one or more hardware components. The application 304 in some embodiments causes client-side programs installed on client devices 300a-b to display information transmitted to the client devices 300a-b by the application 304 via the network 301. The client-side programs in some embodiments comprise mobile applications. The client-side programs may also include web browsers. The client-side programs may also include applications as set forth above in reference to FIGS. 2-3.

The map component 403 in some embodiments selects points of interest for use by users. A point of interest, in some embodiments, is any place at all where more than one person can be present at a time. Points of interest may include houses, parks, office buildings, offices, malls, shopping centers, stores, discotheques, bars, restaurants, recreational centers, clubs, gymnasiums, cafes, libraries, museums, universities, schools, laboratories, squares, intersections, portions of streets or roads, farms, resorts, religious institutions, tourist attractions, boats, ships, amusement parks, homes, houses, apartments, apartment buildings, courts, legislative chambers, government offices, government buildings, public transportation stations, any building, any part of any building, any body of water, and any area of land. Some points of interest may be located on particular stories of high-rise buildings, such as skyscrapers. In some embodiments, memory accessible to the server 302 contains a map containing the location information of points of interest. In some embodiments, the map is stored in the server 302 itself. In some embodiments, the map is stored in a database 214 accessible to the server 302. In other embodiments, the map is a third-party product, such as Google® maps, from which the server 302 can obtain data concerning points of interest, their locations, and the area surrounding them.

The application 304 provides communication services in some embodiments. In some embodiments, communication services include services, such as "chat rooms" that allow at least two users to communicate instantaneously using text. In some embodiments, communication services include streaming services that permit audio conversations. In some embodiments, communication services include streaming services that permit conversations combining video and audio streaming (e.g. "video chat"). In some embodiments, the communication services include services that accept user-input data and transmit the user-input data to multiple client devices 300a-c. The user-input data may be text. The user-input data may include photographs. The user-input data may include audio content. The user input data may also include video content. The user-input data may be transmitted for display on web browsers operating on client devices 300a-c. The user-input data may be transmitted for display on mobile applications operating on client devices 300a-c.

FIG. 1 illustrates some embodiments of the disclosed method 100. The method 100 includes selecting, by the server, at least one point of interest maintained in memory accessible to the server (101). In addition, the method 100 includes determining, by the server, at least one virtual area around the at least one point of interest (102). The method 100 also includes detecting, by the server, devices in use within the at least one virtual area (103). The method 100 includes publishing, by the server, the results of that detection to at least one client device (104) as well.

The method 100 includes selecting, by the server, at least one point of interest maintained in memory accessible to the server (101). In some embodiments, selecting the at least one point of interest involves transmitting, by the server, a set of all points of interest belonging to a particular geographical area to a client device operated by a user, and receiving, by the server and from the client device, user inputs selecting at least one point of interest from the set. The map component 402 may produce the initial set of points by determining the location of the user, by processes set forth in more detail below, and selecting a set of points of interest in the user's vicinity. The map component 402 may find points of interest in the user's vicinity by retrieving all points of interest that are within a circular area around the user defined by a certain length. The map component 402 may find points of interest in the user's vicinity by determining the local governmental zone, for instance a municipality, containing the user. The map component 402 may also find points of interest in a section of the map centered around the user. The map component 402 may determine the scale of the section by applying a default scale calculated to match the likely distance a user would be willing to travel to a point of interest. In some embodiments, the user can modify the scale of the section by zooming in or out; the map component 402 may find more points of interest in the wider section revealed when the user zooms out. In some embodiments, selecting the at least one point of interest involves transmitting, by the server, a set of all points of interest belonging to a particular category to a client device operated by a user, and receiving, by the server and from the client device, user inputs selecting at least one point of interest from the set. In some embodiments, the server maintains a set of categories describing different kinds of points of interest, and associates each point of interest with at least one category. For instance, the map component 402 may determine and send to the user a list of all points of interest the server identifies as bars. The map component 402 may also limit the list of points of interest by both category and by geographical region; for instance, the map component 402 might supply the user with a set of bars in area near the user's current location. In some embodiments, selecting the at least one point of interest involves receiving, by the server, a user-input query, and finding, by the server, at least one point of interest matching the query. The map component 402 may compare keywords pertaining to the points of interest to the query. In some embodiments, keywords concerning the points of interest are stored together with data concerning the points of interest in memory accessible to the server 302. In some embodiments, keywords are stored in a database 214 accessible to the server 302.

Figure 5A:
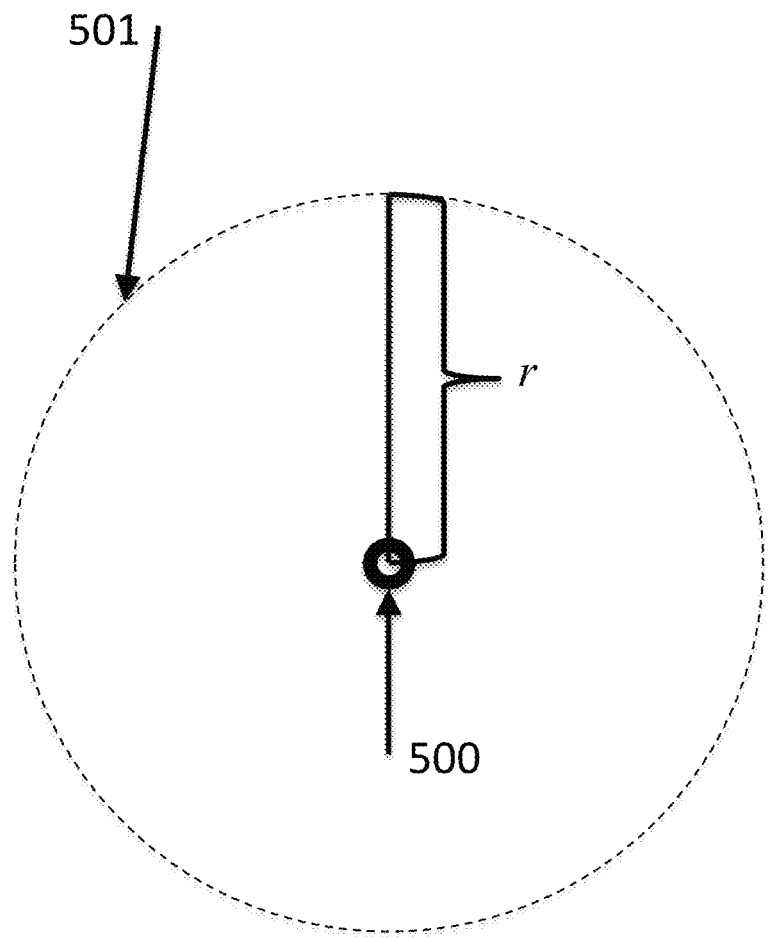
FIG. 5A is a schematic diagram depicting one embodiment of the method for establishing a virtual area around a point of interest.
Figure 5B:
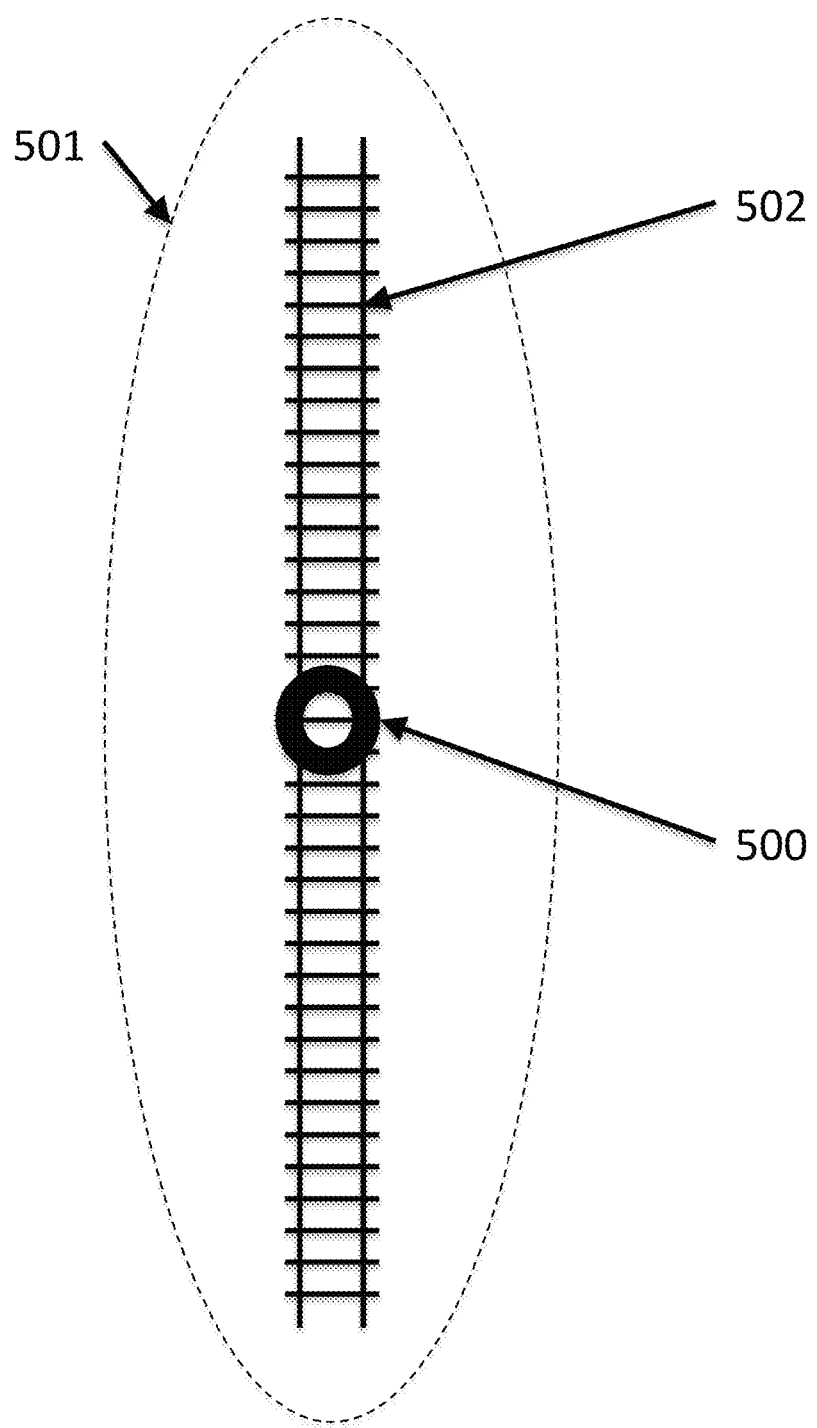
FIG. 5B is a schematic diagram depicting another embodiment of the method for establishing a virtual area around a point of interest.

In addition, the method 100 includes determining, by the server, at least one virtual area around one point of interest (102). In some embodiments, the map component 402 determines the at least one virtual area by establishing a maximum distance from one point of interest such that all points closer to the point of interest than the maximum distance are in the virtual area. FIG. 5A illustrates one embodiment of this procedure. In one embodiment, the map component 402 first derives a specific geographic point 500 within the point of interest, from which to measure distances from the point of interest. The map component 402 may subsequently select a distance r with which to define a virtual area around the point of interest. Then, in some embodiments, the border 501 of the virtual area is the circumference of a circle of radius r centered at the geographic point 500 representing the point of interest. In other embodiments, the distance r defines a three-dimensional virtual area around the point of interest, such as a sphere of radius r. In some embodiments, the map component 402 determines the at least one virtual area by establishing a maximum time such that all persons capable of arriving at one point of interest within the maximum time are in the virtual area. FIG. 5B illustrates some embodiments of this process. As before, the map component 402 may derive a specific geographic point 500 from which to measure distances from the point of interest. Next, the map component 402 may choose a time within a user must be able to arrive at the point of interest (not shown). If every user is on foot, the area defined by the chosen time is a circle once again. If along one axis, users are able to avail themselves of public transportation 502, then the distance from the point representing the point of interest 500 to the border of the virtual area 501 will be dilated along that axis, perhaps producing an elliptical virtual area. Every user within that virtual area may expect to arrive at the point representing the point of interest 500 within the allotted time from the moment of setting forth. In some embodiments, a user may be located geographically close to the point of interest, but several floors up in a tall building; in that scenario, the map component 402 may include in the estimate of the time to arrive at the point of interest the amount of time it will take the user to descend to ground level.

Figure 5C:
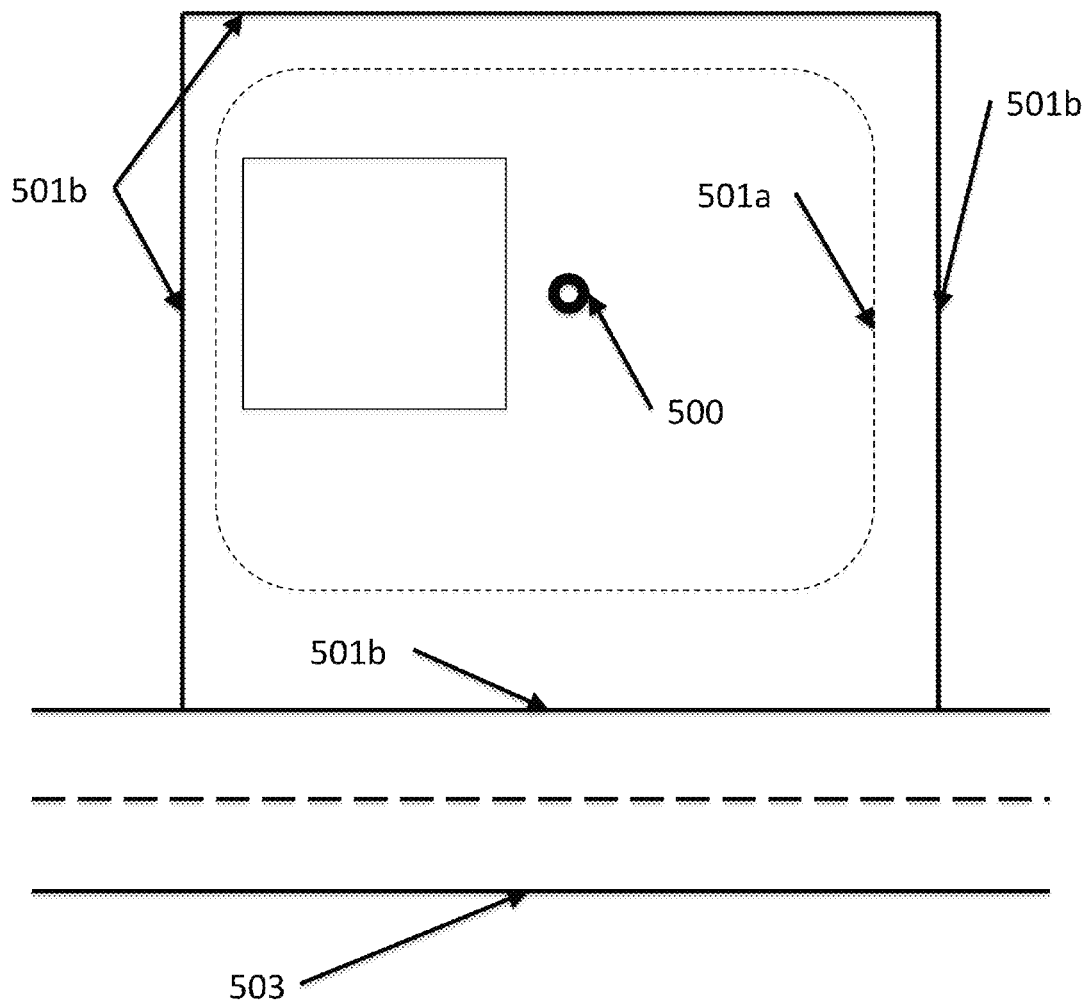
FIG. 5C is a schematic diagram depicting still another embodiment of the method for establishing a virtual area around a point of interest.

In other embodiments, the map component 402 determines the at least one virtual area by determining the physical boundaries of a property containing one point of interest. For instance, as illustrated by FIG. 5C, at a sufficiently high resolution of a street grid 503, the map may show the footprint of a building that represents a point of interest 500. In some embodiments, the perimeter 501a of that footprint represents the boundary of the virtual area around the point of interest 500. In other embodiments, the boundary may also include the ceiling and floor of a story in a multistory building, so that the virtual area is that story of that building. In other embodiments, the map component 402 uses similar boundary data available for points of interest that are not buildings. In some embodiments, the all of the physical boundaries are not available to the map component 402, but a sufficient description of the point of interest permits the map component 402 to produce estimated physical boundaries of the point of interest, which the map component 402 adopts as the boundary of the virtual area around one point of interest. For instance, the map component 402 may be able to establish the vertices of a property that is roughly rectangular, and thus create a rectangular virtual area that approximates the physical perimeter of the property. Likewise, the map component may multiply the floor number corresponding to a point of interest that is on a particular floor of a building by a typical distance between floors to estimate its location. In some embodiments, the map component 402 determines the at least one virtual area by determining the legal boundaries of a property containing one point of interest. For instance, in FIG. 5C, the deed of the parcel of land on which the point of interest 500 is located may establish the boundaries 501b of the parcel, and the map component 402 may adopt those boundaries 501b as the perimeter of the virtual area containing the point of interest 500. In some embodiments, the map component 402 divides the map of the geographical region containing the point of interest into a rectangular grid, and treats all rectangles within or overlapping the virtual area as part of the virtual area.

Figure 5D:
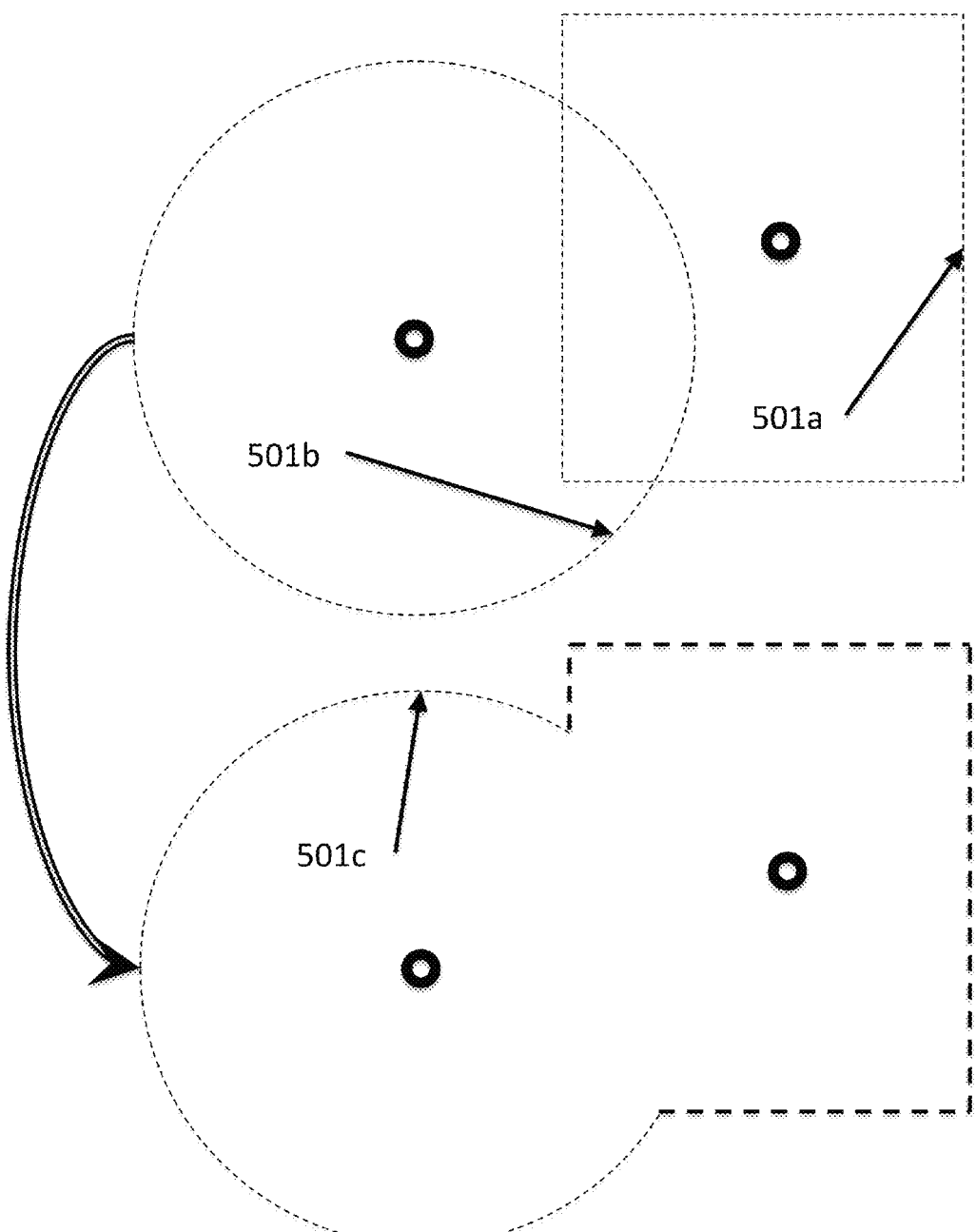
FIG. 5D is a schematic diagram depicting yet another embodiment of the method for establishing a virtual area around a point of interest.

In some embodiments, determining the at least one virtual area involves combining at least two virtual areas into a new virtual area containing their union. In some embodiments, as illustrated by FIG. 5D, one virtual area 501a established by the map component 402 may overlap with another virtual area 501b established by the map component. In some embodiments, the map component 402 may merge the two virtual areas to produce a new virtual area 501c combining the two original virtual areas. In some embodiments, the map component 402 creates a virtual area out of the union of a plurality of virtual areas. In some embodiments, the new virtual area is the union of non-contiguous virtual areas.

Figure 5E:
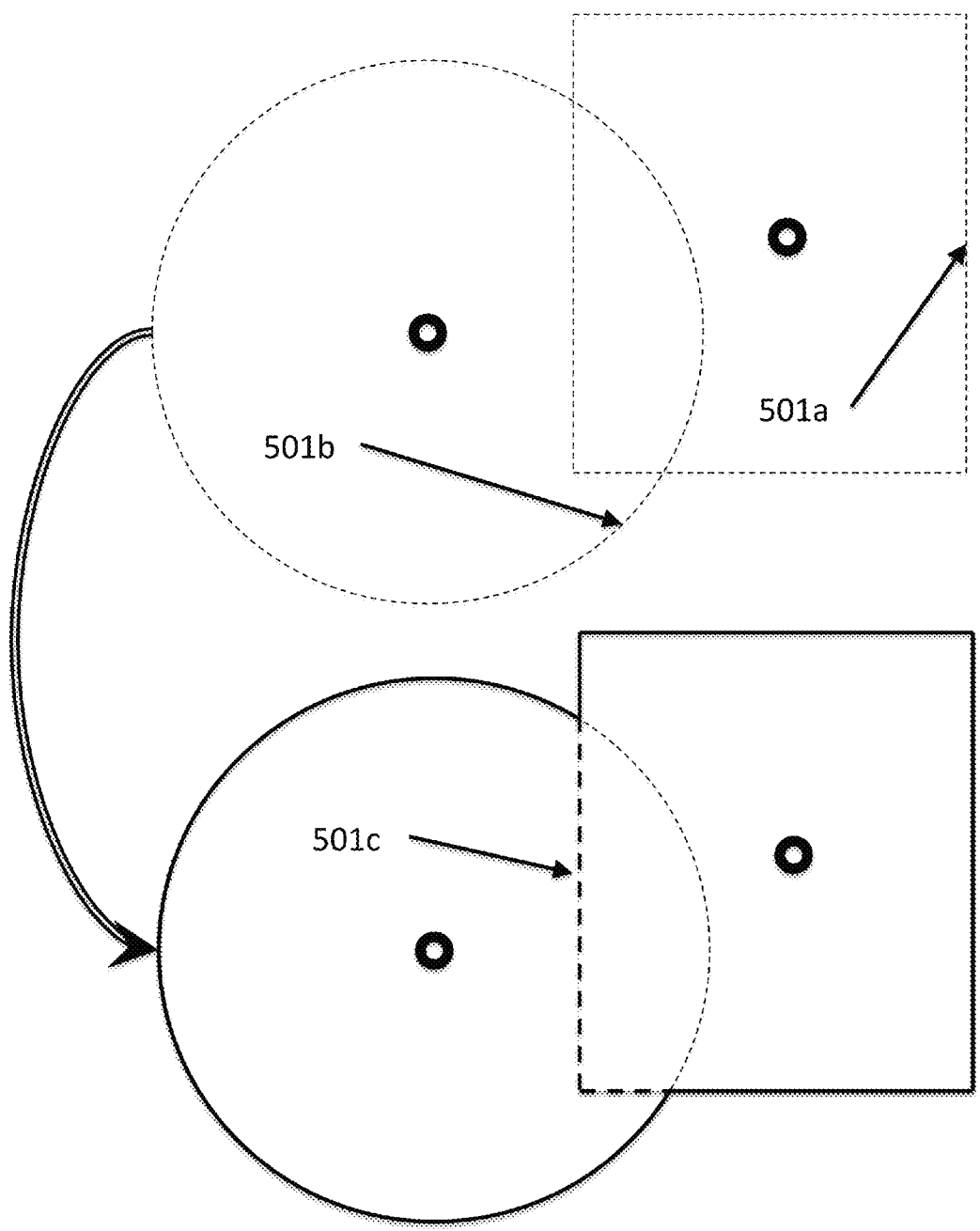
FIG. 5E is a schematic diagram depicting an additional embodiment of the method for establishing a virtual area around a point of interest.

In additional embodiments, determining the at least one virtual area involves combining at least two virtual areas into a new virtual area containing their intersection. In some embodiments, as illustrated by FIG. 5E, one virtual area 501a established by the map component 402 may overlap with another virtual area 501b established by the map component. In some embodiments, the map component 402 may overlay the two virtual areas to produce a new virtual area 501c containing only the overlap between the two virtual areas. In some embodiments, the map component 402 creates a virtual area out of the intersection of a plurality of virtual areas. In some embodiments, the map component 402 creates a union of virtual areas that include at least one virtual area representing the intersection between other virtual areas.

In some embodiments, the map component 402 determines the at least one virtual area by determining a category to which one point of interest belongs, and determining the size of the at least one virtual area based on the category. For instance, in some embodiments, a virtual area containing a maximum distance from a point representing the point of interest will use a larger distance for the calculation if the point of interest is a physically large, for example a stadium, than if the point of interest is physically small, for example a café. The map component 402 may also determine the at least one virtual area by maintaining customer ratings of one point of interest in memory accessible to the server, and determining the size of the virtual area based on the customer ratings. For instance, if the virtual area around a restaurant is defined in terms of the time it takes to arrive at the restaurant, the map component 402 may use a longer maximum time to arrive at the restaurant where the restaurant receives extremely high ratings. In other embodiments, the manner of derivation of the at least one virtual area will be determined by user inputs. Users may input the style of the virtual area in some embodiments, choosing which of the above approaches to creating the virtual area the map component 402 will use. Likewise, users may input the size of the virtual area the map component 402 will create.

The method 100 also includes detecting, by the server, devices in use within the at least one virtual area (103). In some embodiments, the device location component 403 performs this step by identifying a device having a fixed location known to be in the virtual area. In some embodiments, the device location component 403 maintains in memory accessible to the server 302 a geographical location associated with a particular internet protocol (IP)) address, and thus can determine that a machine using that address is located at that geographical location. In some embodiments, the device location component 403 maintains in memory accessible to the server 302 a geographical location associated with the identity of a particular machine. In some embodiments, the device location component 403 maintains in memory accessible to the server 302 a vertical location, such as a floor number, associated with a particular IP address. In some embodiments, the device location component 403 maintains in memory accessible to the server 302 a vertical location associated with the identity of a particular machine. For example, a machine may be a desktop computer that a user identifies as his or her work machine. In some embodiments, the user will enter the address of his or her workplace on the server 302. The server 302 may maintain information identifying the desktop, and thus may be able to determine that a user is using the desktop as a client device 300. Thus, the server 302 may be able to place a user of that desktop at the stored work address. In other embodiments the server 302 maintains the location of a wireless router, and thus determines that a device coupled to that router is within the area of the wireless router's range. In some embodiments, the wireless router is associated with a particular floor in a building, so that the device location component 403 can determine that the device is on that floor if it is in range of the wireless signal. The device location component 403 may place a device that is coupled to more than one wireless router simultaneously, by placing the device in the union of the multiple routers' ranges. In some embodiments, the device location component 403 receives data from the device describing the strength of signal from wireless routers located on different floors, and compares the signal strengths to determine which floor the device is on.

In another embodiment, the device location component 403 detects devices within the at least one virtual area by receiving, from a device, location data, determining that the location data falls within the virtual area, and identifying the device as located within the at least one virtual area. In some embodiments, devices receive their location data from navigation facilities coupled to the devices. The devices may receive their location data from the GPS network. The devices may receive their location data from other satellite networks. The devices may receive their location data by the process of cell tower triangulation. A device may receive location data from another device in its vicinity that possesses navigation means. A device may be in a fixed location and maintain in its memory the location data corresponding to that fixed location. A device may be coupled to a device that is in a fixed location and that maintains in its memory the location data corresponding to that fixed location.

Figure 6:
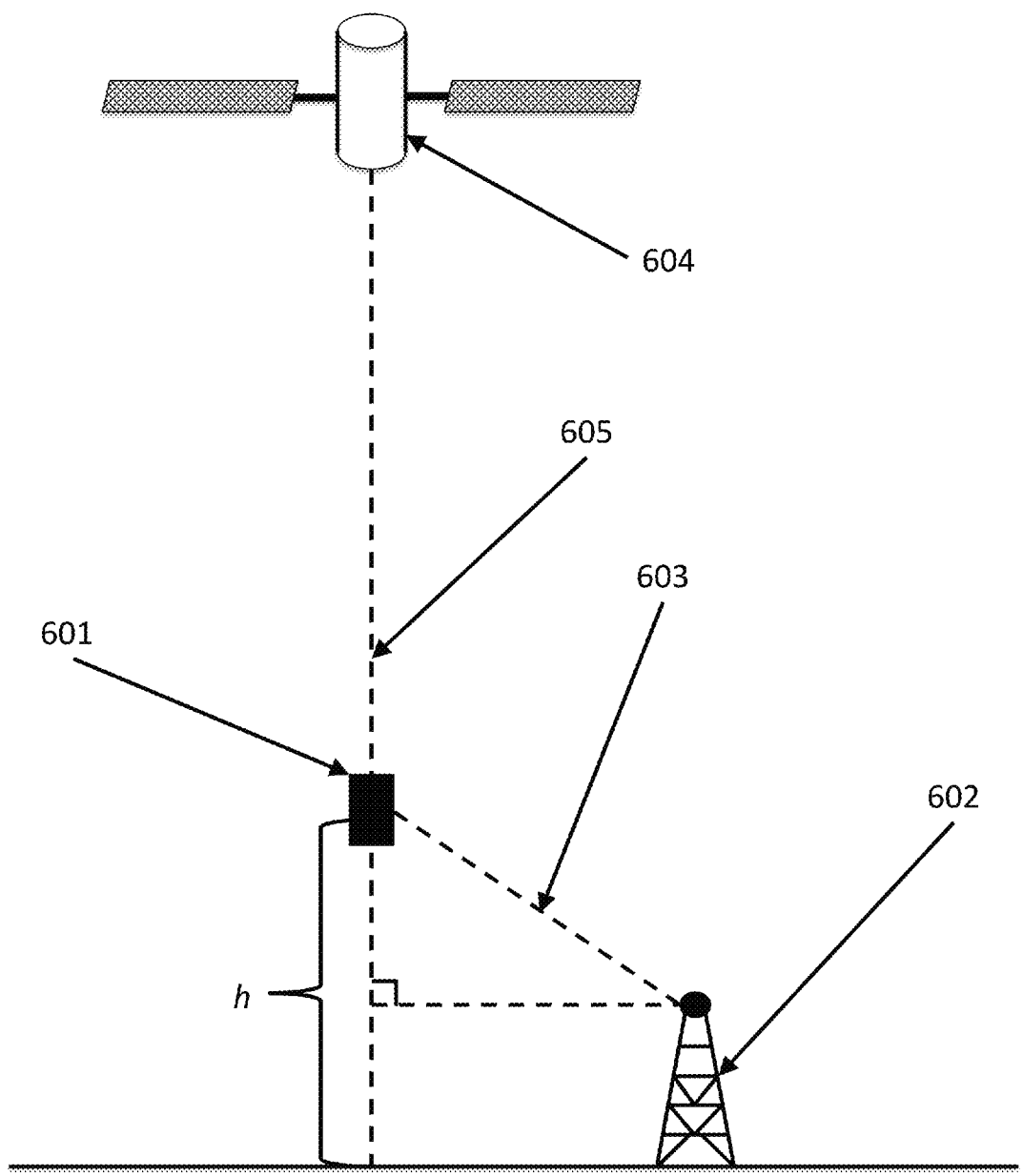
FIG. 6 is a schematic diagram depicting a technique for finding the vertical location of a device.

Once the device location component 403 has determined the location of an electronic device, it may compare that location data to the instant virtual area, to determine if the device is located within the virtual area. The device location component accomplishes this in some embodiments by computing the distance from the location data to the point of interest, and determining that a point within the computed distance of the point of interest is in the virtual area. In some embodiments where the virtual area is determined by establishing a maximum distance from the point of interest such that all points closer to the point of interest than the maximum distance are in the virtual area, the device location component 403 calculates the distance between the device location and the specific point representing the point of interest, and compares that distance to the maximum distance. In some embodiments, the device location component 403 uses altitude data provided by location services, such as GPS altitude data, to determine the vertical location of the device. In some embodiments, the device location component 403 determines the vertical location of a device by detecting at least one local wireless transmitter, measuring the strength of signal of the at least one transmitter to calculate an approximate distance from the transmitter and using the approximate distance and the location data to determine the vertical location of the device. FIG. 6 illustrates this approach in some embodiments. The device 601 detects a signal from a wireless transmitter 602. The transmitter 602 may be a cell phone tower, a wireless router, or any other device releasing a wireless signal. The device 601 also detects the strength of the wireless signal. If the location and output strength of the transmitter is known, the strength of signal allows the device location component 403 to determine the distance 603 from the wireless transmitter 602 to the device 601 using the inverse square law. The device 601 also receives its horizontal location 605 from the location services 604. If the height of the wireless transmitter 602 above the ground is known, the device location component 403 can thus determine the difference in height between the device 601 and the transmitter 602, and use that difference and the transmitter's known height to calculate the vertical location h of the device 601. Where there is more than one transmitter (not shown), the device location component 403 may repeat this process for each transmitter, and combine the results to obtain the final vertical location.

In other embodiments, the map component 402 determines that the location data is within the virtual area by deriving a collection of coordinates that fall on the boundaries of the virtual area, and comparing the location data to the coordinates in the collection. In some embodiments, determining that the location data falls within the at least one virtual area comprises determining a display resolution, mapping the coordinates corresponding to each pixel within the virtual area at the determined resolution, and matching the location data to the coordinates corresponding to a pixel in the virtual area at the determined resolution. The determined resolution in some embodiments is the resolution at which the map is displayed by default. In some embodiments, the resolution is determined by the requirements of a particular client device 300. In some embodiments, the resolution is determined by user input; for instance, the user may enlarge the portion of the map on the display of a client device 300, increasing the number of pixels occupying the virtual area in question, prompting the map component 402 to calculate the coordinates corresponding to the additional pixels. In some embodiments, the location data is rounded to the nearest coordinates corresponding to a pixel at the determined resolution level. In some embodiments, the device location component 403 assesses vertical coordinates at the same resolution as the horizontal coordinates, finds the three-dimensional coordinates of the device, and locates the device within a three-dimensional array of coordinates.

In some embodiments where the virtual area is determined by establishing a maximum time such that all persons capable of arriving at the point of interest within the maximum time are in the virtual area, the device location component 403 calculates the time that the user of the device is likely to take to arrive at the location, and compares the calculated time to the maximum time. In some embodiments where the virtual area is established by determining the physical boundaries of a property containing the point of interest, the device location component 403 assesses whether the device location falls within those boundaries as described above. In some embodiments, where the map component 402 has divided the geographical area containing the point of interest into a rectangular grid, the device location component 403 determines which rectangle in the grid contains the device location, and then determines whether that rectangle is one of the rectangles containing a portion of the virtual area. In some embodiments where the virtual area is established by determining the legal boundaries of a property containing the point of interest, the device location component 403 assesses whether the device location falls within the perimeter defined by those boundaries, as described above. In some embodiments where the map component has created the virtual area by combining at least two virtual areas into a new virtual area containing their union, the device location component 403 determines if the location of the device falls within any one of the virtual areas that combine to form the union. In embodiments wherein the map component 402 established the virtual area by combining at least two virtual areas into a new virtual area containing their intersection, the device location component 403 determines if the device location falls within each of the virtual areas that combine to form the intersection.

The method 100 also includes publishing, by the server, the results of that detection to at least one client device (104). This step permits devices using the system 400 to identify users, known as "insiders" that are located within the virtual area. In some embodiments, the social network component 404 transmits the identity of each device in the virtual area to any client device 300a-c that requests the information via the network. In some embodiments, the social network component 404 publishes the results of the detection by determining, by the server, the user of a device in the virtual area, determining, by the server, a user group in which the user is a member, determining the members of the user group, and publishing the location of the device only to members of the user group. Determining the user of a device in the area may involve the user registering with the system 400 and creating a user account. The user account may include a datum that uniquely identifies the user. The user account may also include the user's name, contact information, and demographic information. The user account may also contain the identity of user groups in which the user is a member, and may also identify user accounts of other users in those user groups. In some related embodiments, the user group is created by the invitation of a user. A person organizing a particular event may organize the user group. The user group may be a persistent group of users that have been identified by one person, such as a list of the person's "friends." The user group may be a set of users that share a common interest. In other embodiments, the user group is created by the server. In some embodiments, the user group created by the server is the set of all users located in the at least one virtual area. In some embodiments, the user group created by the server is the set of all users that have some characteristic in user profiles associated with the users. For example, the server may create a user group for every person who works at a particular place of employment. The server may create a user group for every person who went to a particular school. The server may create a user group for every person who reports having a particular hobby.

Some embodiments of the method 100 also involve providing, by the server, communication services between users, as described above in reference to FIG. 4. In some embodiments, any user of the system 400 may initiate conversation with any other user. In some embodiments, the communication between the two users is visible to any other user. In some embodiments, any user can join the conversation between the two users. In some embodiments, a user can initiate conversation with a plurality of other users. In other embodiments, communication between any two users is visible only to the two participants. Further embodiments involve restricting at least one of the communication services to members of a user group. For instance, text chat may be available to members of the user group, while electronic mail messages are available to all users. In some embodiments, communication between two users in a user group is visible to any other user. In some embodiments, communication between two users in a user group is visible only to members of the user group. In some embodiments, any member of the user group may participate in a conversation between other members of the user group. Additional embodiments involve restricting at least one of the communication services to devices located in the at least one virtual area. In some embodiments, any user of a device located in the virtual area may participate in a conversation between any two users of devices in the virtual area. In some embodiments, nobody can see a conversation between two users of devices in the virtual area except those two users. In other embodiments, the user of any device in the virtual area may see the conversation. In other embodiments, any user may view the conversation. In some embodiments, only users of devices located in the at least one virtual area who are also members of the same user group may communicate with each other using the communication services. In some embodiments, a third party offers the communication services. For instance, the server 302 might create text chat accounts for users of the system 400 on another platform that provides text chat services, and route user text chats through that platform.

It will be understood that the system and method may be embodied in other specific forms without departing from the spirit or central characteristics thereof. The present examples and embodiments, therefore, are to be considered in all respects as illustrative and not restrictive, and the system method is not to be limited to the details given herein.

What is claimed is:

1. A method for location-sensitive social networking, comprising:
    selecting, by the server, at least one point of interest maintained in memory accessible to the server;
    determining, by the server, at least one virtual area around the at least one point of interest;
    detecting, by the server, devices in use within the at least one virtual area; and
    determining, by the server, the user of a device in the at least one virtual area;
    determining, by the server, a user group in which the user is a member;
    determining the members of the user group;
    publishing the location of the device only to members of the user group; and
    wherein determining the at least one virtual area further comprises establishing a maximum time such that all persons capable of arriving at one point of interest within the maximum time are in the virtual are in the virtual area.

2. A method according to claim 1, wherein selecting the at least one point of interest comprises: transmitting, by the server, a set of all points of interest belonging to a particular geographical area to a client device operated by a user; and receiving, by the server and from the client device, user inputs selecting at least one point of interest from the set.

3. A method according to claim 1, wherein selecting a point of interest comprises: receiving, by the server, a user-input query; and finding, by the server, at least one point of interest matching the query.

4. A method according to claim 1, wherein determining the at least one virtual area comprises establishing a maximum distance from one point of interest such that all points closer to the point of interest than the maximum distance are in the virtual area.

5. A method according to claim 1, wherein determining the at least one virtual area comprises determining the physical boundaries of a property containing one point of interest.

6. A method according to claim 1, wherein determining the at least one virtual area further comprises combining at least two virtual areas into a new virtual area containing their union.

7. A method according to claim 1, wherein determining the at least one virtual area further comprises combining at least two virtual areas into a new virtual area containing their intersection.

8. A method according to claim 1, wherein determining the at least one virtual area further comprises: determining, by the server, a category to which one point of interest belongs; and determining, by the server, the size of the at least one virtual area based on the category.

9. A method according to claim 1, wherein detecting devices in use within the at least one virtual area comprises identifying a device having a fixed location known to be in the at least one virtual area.

10. A method according to claim 1, wherein detecting devices in use within the at least one virtual area comprises: receiving, from a device, location data;
    determining that the location data falls within the at least one virtual area; and
    identifying the device as located within the at least one virtual area.

11. A method according to claim 10, wherein detecting devices in use within the at least one virtual area comprises: detecting at least one local wireless transmitter;
    measuring the strength of signal of the at least one transmitter to calculate an approximate distance from the transmitter; and using the approximate distance and the location data to determine the vertical location of the device.

12. A method according to claim 10, wherein determining that the location data falls within the at least one virtual area comprises: computing the distance from the location data to the point of interest; and determining that a point within the computed distance of the point of interest is in the virtual area.

13. A method according to claim 10, wherein determining that the location data falls within the at least one virtual area comprises: deriving a collection of coordinates that fall on the boundaries of the virtual area; and comparing the location data to the coordinates in the collection.

14. A method according to claim 10, wherein determining that the location data falls within the at least one virtual area comprises: determining a display resolution; mapping the coordinates corresponding to each pixel within the virtual area at the determined resolution; and matching the location data to the coordinates corresponding to a pixel in the virtual area at the determined resolution.

15. A method according to claim 1, further comprising providing, by the server, communication services between users.

16. A method according to claim 1, further comprising restricting at least one of the communication services to members of a user group.

17. A method according to claim 1, further comprising restricting at least one of the communication services to devices located in the at least one virtual area.

18. A system for location-sensitive social networking, comprising:

at least one server having a processor and a memory; a map component, executing on the server, selecting at least one point of interest maintained in memory accessible to the server, and determining at least one virtual area around the at least one point of interest; a device location component, executing on the server and detecting devices in use within the at least one virtual area; and a social network component, executing on the server, determining the user of a device in the at least one virtual area, determining a user group in which the user is a member, determining the members of the user group, and publishing the location of the device only to members of the user group, and publishing the results of that detection to at least one client device; wherein determining the at least one virtual area further comprises establishing a maximum time such that all persons capable of arriving at one point of interest within the maximum time are in the virtual are in the virtual area.

* * * * *